US010052997B2

(12) United States Patent
Shibata et al.

(10) Patent No.: US 10,052,997 B2
(45) Date of Patent: Aug. 21, 2018

(54) ILLUMINATION DEVICE FOR VEHICLE

(71) Applicant: Koito Manufacturing Co., Ltd., Tokyo (JP)

(72) Inventors: Hiroki Shibata, Shizuoka (JP); Shinya Kato, Shizuoka (JP); Kazutami Oishi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/171,786

(22) Filed: Jun. 2, 2016

(65) Prior Publication Data
US 2016/0368412 A1 Dec. 22, 2016

(30) Foreign Application Priority Data

Jun. 17, 2015 (JP) .................................. 2015-122103

(51) Int. Cl.
*B60Q 1/076* (2006.01)
*B60Q 1/068* (2006.01)
(Continued)

(52) U.S. Cl.
CPC .......... *B60Q 1/076* (2013.01); *B60Q 1/0683* (2013.01); *F21S 41/147* (2018.01); *F21S 45/47* (2018.01);
(Continued)

(58) Field of Classification Search
CPC ... B60Q 1/076; B60Q 1/0683; F21S 48/1159; F21S 48/328; F21S 48/125;
(Continued)

(56) References Cited

U.S. PATENT DOCUMENTS

2014/0233252 A1* 8/2014 Shibata ................. F21S 48/321
362/512

FOREIGN PATENT DOCUMENTS

JP 2011-134637 A 7/2011
JP 2014-157710 A 8/2014
(Continued)

OTHER PUBLICATIONS

An Office Action dated May 11, 2017, issued from the Korean Intellectual Property Office (KIPO), of Korean Patent Application No. 10-2016-006732 and an English translation thereof.
(Continued)

*Primary Examiner* — Sonji Johnson
(74) *Attorney, Agent, or Firm* — Abelman, Frayne & Schwab

(57) ABSTRACT

A housing defines at least a part of a lamp chamber therein, and includes an opening; a light source disposed in the lamp chamber. An optical unit is disposed in the lamp chamber, and irradiates light emitted from the lamp source in a predetermined direction. A heat sink includes a first portion configured to support the light source in the lamp chamber, and a second portion exposed to an outside of the housing through the opening. An elastic member is disposed between the second portion and a periphery of the opening. A first screw member and a second screw member extend through the housing, and are manually rotated to displace both the heat sink and the optical unit with respect to the housing. An electric actuator is disposed in the lamp chamber, and displaces the optical unit with respect to the heat sink.

12 Claims, 13 Drawing Sheets

(51) Int. Cl.
   *F21S 41/147* (2018.01)
   *F21S 45/47* (2018.01)
   *F21S 8/10* (2006.01)
   *F21S 41/25* (2018.01)
(52) U.S. Cl.
   CPC ......... *F21S 48/1159* (2013.01); *F21S 48/328* (2013.01); *F21S 41/25* (2018.01); *F21S 48/125* (2013.01)
(58) Field of Classification Search
   CPC ... G07F 19/2055; G07F 7/0873; G06K 7/087; G06K 7/082; G06K 13/067
   See application file for complete search history.

(56) References Cited

FOREIGN PATENT DOCUMENTS

| KR | 10-2009-0088631 A | 8/2009 |
| KR | 10-2015-0019787 A | 2/2015 |

OTHER PUBLICATIONS

An Office Action dated Dec. 18, 2017, issued from the Korean Intellectual Property Office (KIPO), of Korean Patent Application No. 10-2016-0067362 and an English translation thereof.

\* cited by examiner

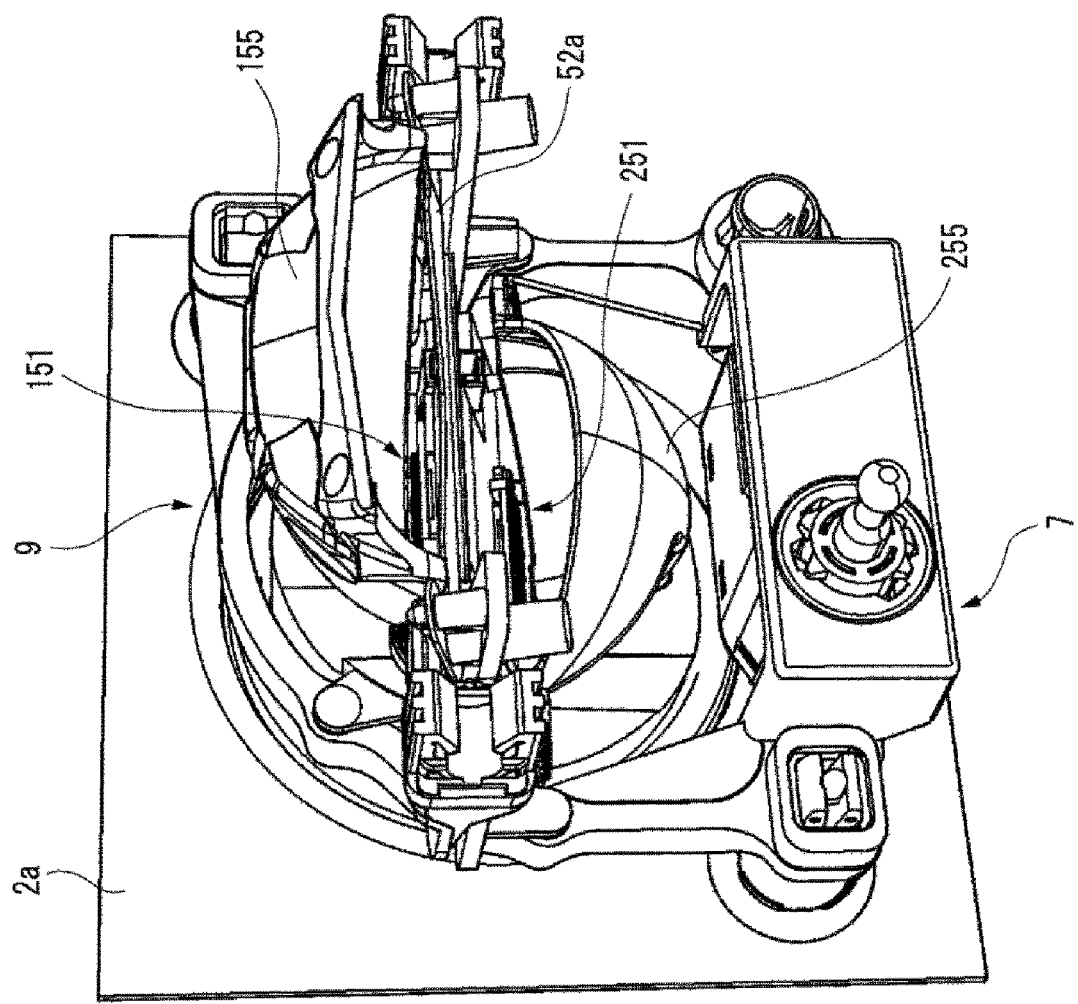
FIG.11
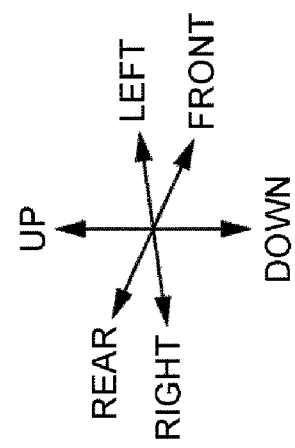

ILLUMINATION DEVICE FOR VEHICLE

CROSS-REFERENCE TO RELATED APPLICATIONS

This application is based on and claims priority from Japanese Patent Application No. 2015-122103, filed on Jun. 17, 2015, with the Japan Patent Office, the disclosure of which is incorporated herein in its entirety by reference.

TECHNICAL FIELD

The disclosure relates to an illumination device mounted on a vehicle.

BACKGROUND

An illumination device described in Japanese Patent Laid-Open Publication No. 2011-134637 includes a light source, an optical unit, and a heat sink. The light source and the optical unit are disposed in a lamp chamber which is defined by a housing and a light transmitting member. At least a part of light emitted from the light source passes through the optical unit and the light transmitting member to illuminate a predetermined region. The heat sink supports the light source. In order to enhance the dissipation of heat generated from the light source, a part of the heat sink is exposed to the outside through an opening formed in the housing. A sealing member is disposed between the periphery of the opening and the heat sink to suppress water or dust from entering into the lamp chamber through the opening.

The illumination device described in Japanese Patent Laid-Open Publication No. 2011-134637 further includes a screw member that extends through the housing. As the screw member is manually rotated, the initial position of the optical unit is adjusted. Since the relative position of the optical unit and the heat sink is not changed, the posture of the heat sink with respect to the housing is changed according to the rotation of the screw member. In order to allow the displacement of the heat sink in the opening, the sealing member is formed of an elastic or flexible material.

SUMMARY

Even after the initial position of the optical unit is adjusted, there is a demand to change the relative position of the optical unit with respect to the housing depending on the travel state of the vehicle, like a leveling control. A mechanism for performing such a control is required to operate even under a low-temperature environment below −10° C. Under the low-temperature environment, however, the material forming the sealing member is hardened, so that its elasticity or flexibility is lost. Thus, the posture change of the heat sink with respect to the housing is not allowed, so that performance of the control may be disrupted.

An object of the present disclosure is to enable the relative position of the optical unit to be changed with respect to the housing even under a low-temperature environment, while providing a mechanism for manually adjusting the initial position of the optical unit.

In order to achieve the object, according to an aspect of the present disclosure, an illumination device mounted in a vehicle includes: a housing configured to define at least a part of a lamp chamber therein, and including an opening; a light source disposed in the lamp chamber; an optical unit disposed in the lamp chamber, and configured to irradiate light emitted from the lamp source in a predetermined direction; a heat sink including a first portion configured to support the light source in the lamp chamber, and a second portion exposed to an outside of the housing through the opening; an elastic member disposed between the second portion and a periphery of the opening; a screw member extending through the housing, and configured to be manually rotated to displace both the heat sink and the optical unit with respect to the housing; and an electric actuator disposed in the lamp chamber, and configured to displace the optical unit with respect to the heat sink.

According to the above configuration, the adjustment of the initial position of the optical unit is performed by manually rotating the screw member. At this time, both the optical unit and the heat sink are displaced with respect to the housing. The displacement of the heat sink with respect to the housing is allowed by the elastic member.

Meanwhile, a position adjustment of the optical unit by the electric actuator is performed such that the optical unit is relatively displaced with respect to the heat sink. Therefore, even though the elastic member is hardened under a low-temperature environment so that the elasticity or the flexibility, which allows the displacement of the heat sink with respect to the housing, is lost, the position adjustment of the optical unit is not disrupted at all. In other words, since the vehicle is placed under the low-temperature environment after the manual adjustment of the initial position of the optical unit is performed, it is not necessary to consider the hardening of the elastic member in performing, for example, a leveling control. Therefore, it is possible to change the relative position of the optical unit with respect to the housing even under a low-temperature environment, while providing a mechanism for manually adjusting the initial position of the optical units.

The illumination device may be configured as follows. The first portion includes a heat radiation fin. A portion of the heat radiation fin closest to the optical unit is positioned between the light source and the optical unit.

Since the second portion of the heat sink is exposed to the outside of the housing, and the heat radiation fin is also provided in the first portion of the heat sink that is disposed in the lamp chamber, the heat dissipation of the heat sink may be enhanced. The enhancement in heat dissipation suppresses enlargement of the heat sink. Since the enlargement of the relatively heavy heat sink is suppressed, the initial position adjustment of the optical unit may be easily performed manually by the screw member.

The illumination device may be configured as follows. The illumination device further includes a reflector supported by the first portion of the heat sink, and configured to reflect at least a part of the light emitted from the light source toward the optical unit. The first portion includes a recess that is recessed toward the second portion. A part of the reflector is disposed in the recess.

Since the second portion is exposed to the outside of the housing, the heat dissipation of the heat sink is enhanced. Thus, some volume of the heat sink may be used as a space for accommodating the reflector. Accordingly, the utilization efficiency of the space in the lamp chamber may be enhanced, and the enlargement of the illumination device may be suppressed. Further, since the enlargement of the relatively heavy heat sink is suppressed, the initial position adjustment of the optical unit may be easily performed manually by the screw member.

The illumination device may be configured as follows. The elastic member includes: an inner peripheral portion that is in contact with the second portion of the heat sink; and an outer peripheral portion that is in contact with the periphery of the opening of the housing. At least one of the inner peripheral portion and the outer peripheral portion has a circular shape.

During the initial position adjustment of the optical unit by the screw member, the elastic member is deformed by the displacement of the second portion of the heat sink with respect to the housing. According to the above configuration, stress generated due to the deformation is hard to concentrate on a specific point. Therefore, deterioration of the sealability of the elastic member may be suppressed. Further, since the stress generated due to the deformation is hard to concentrate on a specific point, the initial position adjustment of the optical unit may be easily performed manually by the screw member.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 11 is a perspective view illustrating a part of the head lamp device according to a modification (the inside of the lamp chamber).

DETAILED DESCRIPTION

In the following detailed descriptions, reference is made to the accompanying drawings which form a part of the present disclosure. The illustrative embodiments described in the detailed descriptions, drawings, and claims do not intend to limit. Other embodiments may be utilized and other modified examples may be made without departing from the spirit or scope of the subject matter presented in the disclosure.

Hereinafter, an exemplary embodiment of the present disclosure will be described in detail with reference to accompanying drawings. In the respective drawings used in the following description, a scale is suitably changed in order to illustrate each element in a recognizable size. The terms, "right side" and "left side" used in the following description indicate left and right directions viewed from the driver's seat.

Figure 1:
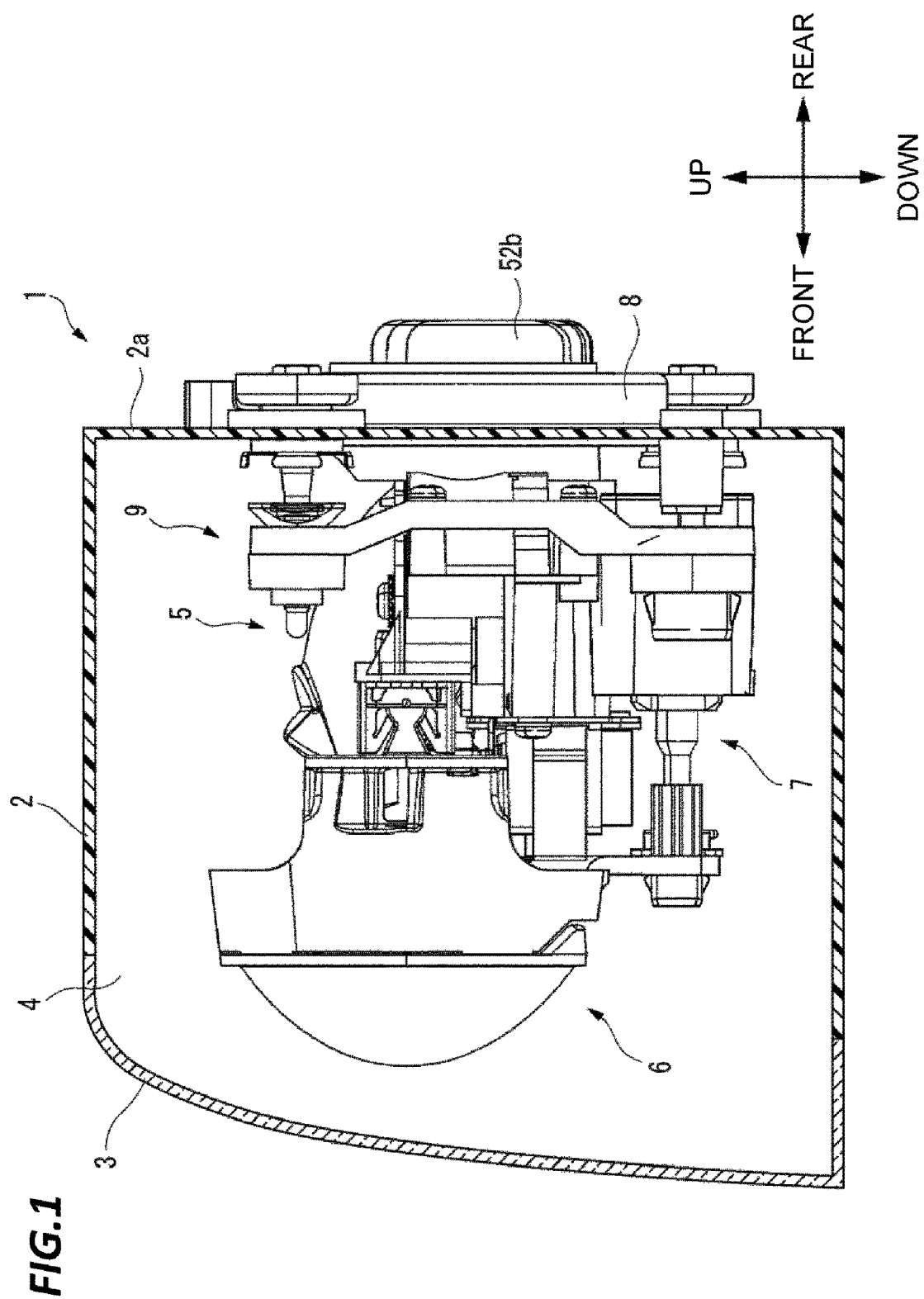
FIG. 1 is a left side view illustrating a head lamp device according to an exemplary embodiment, in a partial sectional view.

FIG. 1 is a view illustrating a head lamp device 1 according to an exemplary embodiment (an exemplary illumination device), which is viewed from the left side after a part of the head lamp device 1 is sectioned vertically. The head lamp device 1 is mounted on a front portion of a vehicle to illuminate the front side of the vehicle. The head lamp device 1 includes a housing 2 and a light transmitting cover 3. The light transmitting cover 3 is mounted on the housing 2 to define a lamp chamber 4. That is, the housing 2 defines a part of the lamp chamber 4.

The head lamp device 1 includes a light source unit 5, an optical unit 6, and an electric actuator 7. A part of the light source unit 5, the optical unit 6, and the electric actuator 7 are disposed in the lamp chamber 4.

Figure 2:
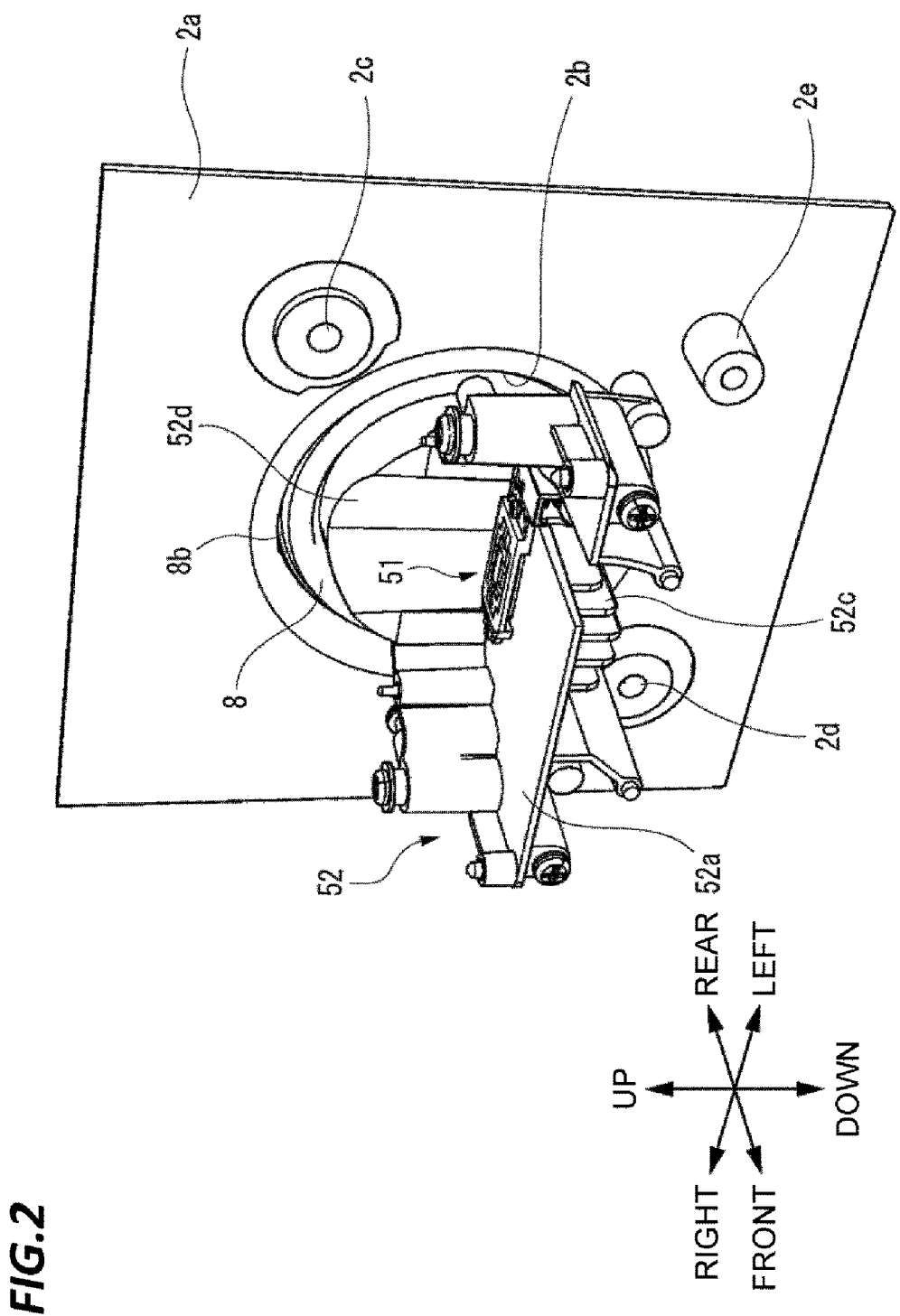
FIG. 2 is a perspective view illustrating a part of the head lamp device (the inside of the lamp chamber).
Figure 3:
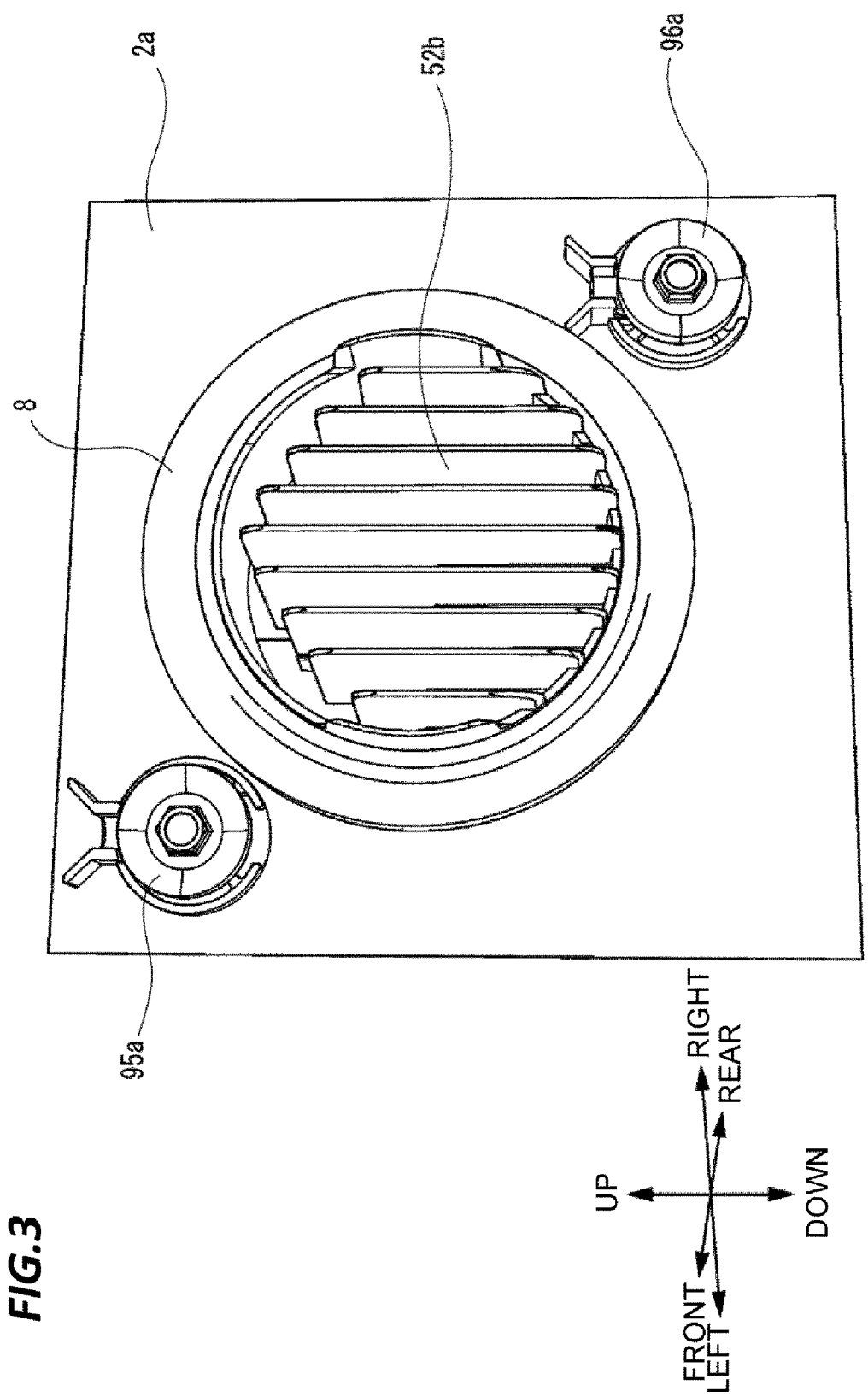
FIG. 3 is a perspective view illustrating an appearance of a part of the head lamp device.

FIG. 2 is a perspective view illustrating a part of a rear wall 2a of the housing 2 and a part of the light source unit 5 when viewed from a left upper front side. FIG. 3 is a perspective view illustrating a part of the rear wall 2a of the housing 2 when viewed from a left lower rear side. A circular opening 2b is formed in the rear wall 2a. The light source unit 5 is supported by the rear wall 2a. The light source unit 5 includes a light source 51 and a heat sink 52.

The light source 51 is disposed in the lamp chamber 4. The light source 51 is constituted by semiconductor light emitting elements. Examples of the semiconductor light emitting elements include light emitting diodes, laser diodes, and organic EL elements. The number of light emitting elements is determined appropriately depending on the specification. Further, a lamp light source (e.g., a discharge lamp or a halogen bulb) may be used as the light source 51.

The heat sink 52 is made of a material having high thermal conductivity such as, for example, a metal. The heat sink 52 includes a first portion 52a and a second portion 52b. The first portion 52a is disposed in the lamp chamber 4. The first portion 52a supports the light source 51. The second portion 52b includes a portion which is exposed to the outside of the housing 2 through an opening 2b. The second portion 52b includes a plurality of heat radiation plates. The plurality of heat radiation plates extend in the vertical direction.

Figure 4:
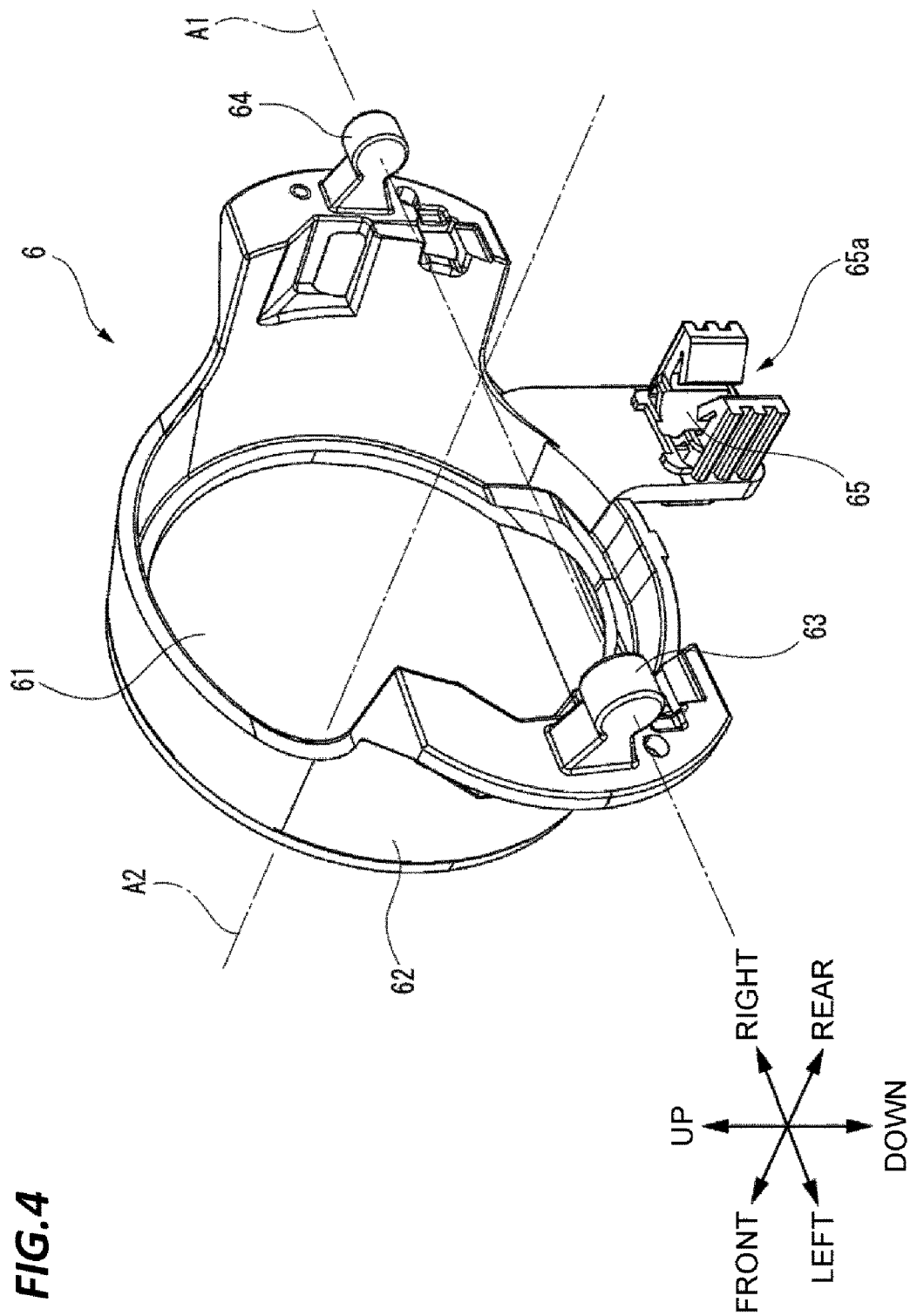
FIG. 4 is a perspective view illustrating an optical unit of the head lamp device.

FIG. 4 is a perspective view illustrating the optical unit 6 when viewed from the left upper rear side. The optical unit 6 includes a projection lens 61 and a lens holder 62. The lens holder 62 supports the projection lens 61. The relative positions of the projection lens 61 and the lens holder 62 are not changed. At least a part of the light emitted from the light source 51 passes through the projection lens 61. The light, which has passed through the projection lens 61, passes through the light transmitting cover 3, and illuminates the front of the head lamp device 1. That is, the optical unit 6 is configured to illuminate the light emitted from the light source 51 forward (an example of the predetermined direction).

The optical unit 6 includes a left shaft portion 63 and a right shaft portion 64. The left shaft portion 63 is provided at a tip end of an arm portion that extends rearward from the left end portion of the lens holder 62. The right shaft portion 64 is provided at a tip end of an arm portion that extends rearward from the right end portion of the lens holder 62. Both the central axes of the left shaft portion 63 and the right shaft portion 64, both having a cylindrical shape, are disposed on an axis A1. The axis A1 extends in a direction orthogonal to an optical axis A2 of the projection lens 61.

The optical unit 6 includes a joint 65. The joint 65 is provided in a lower portion of the lens holder 62. The joint 65 includes a pair of engaging pieces. The pair of engaging pieces forms an engaging groove 65a that is opened rearward.

Figure 5:
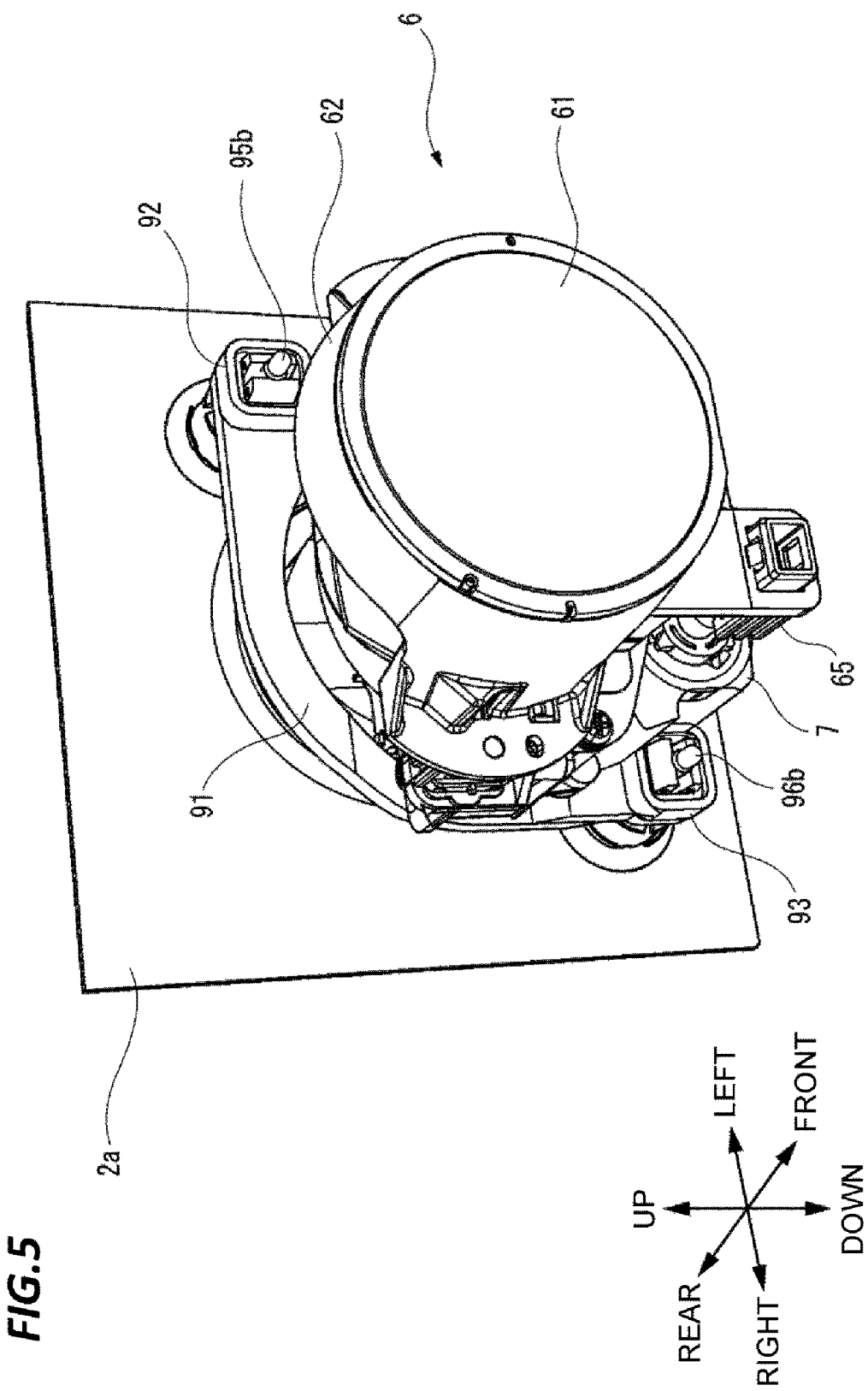
FIG. 5 is a perspective view illustrating a part of the head lamp device (the inside of the lamp chamber).
Figure 6:
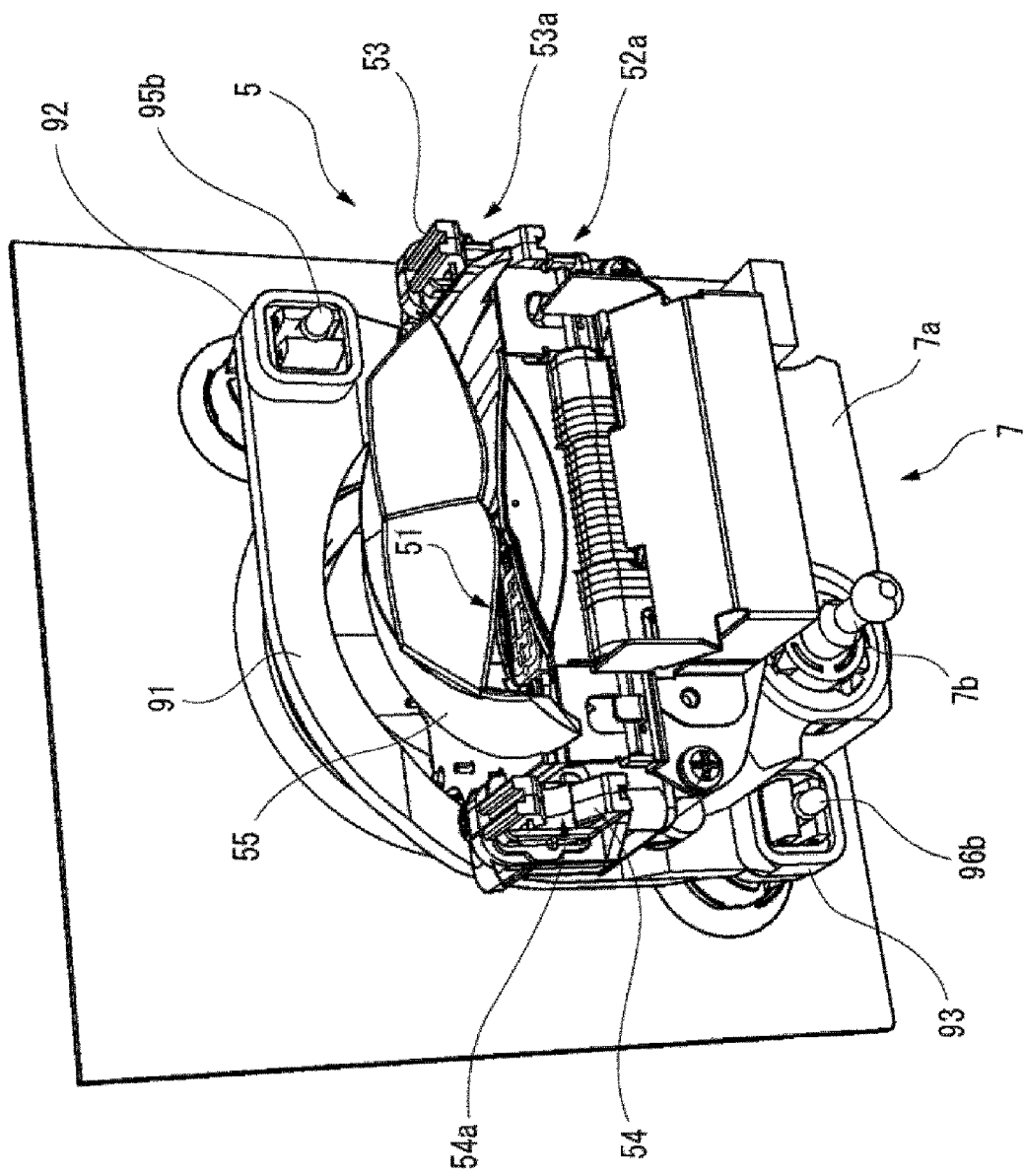
FIG. 6 is a perspective view illustrating a part of the head lamp device (the inside of the lamp chamber).
Figure 6:
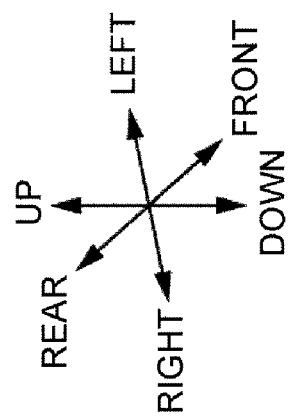

FIG. 5 is a perspective view illustrating a part of the head lamp device 1 (a portion positioned in the lamp chamber 4) when viewed from the right upper front side. FIG. 6 is a perspective view illustrating the head lamp 1 in a state where the optical unit 6 is separated from the state illustrated in FIG. 5.

The optical unit 5 includes a left shaft holding portion 53 and a right shaft holding portion 54. The left shaft holding portion 53 is provided at the left side of the light source 51. The left shaft holding unit 53 includes a pair of engaging pieces. The pair of engaging pieces forms a left engaging groove 53a that is opened forward. The right shaft holding portion 54 is provided at the right side of the light source 51. The right shaft holding unit 54 includes a pair of engaging pieces. The pair of engaging pieces forms a right engaging groove 54a that is opened forward. The relative positions of the left shaft holding unit 53 and the right shaft holding unit 54 are unchanged with respect to the heat sink 52.

The electric actuator 7 is a device that displaces the optical unit 6 with respect to the light source unit 5. Specifically, the electric actuator 7 is used in a leveling control. The leveling control is a control that changes the direction of the axis A2 of the projection lens 61 in the vertical direction of the vehicle depending on the change in height of the vehicle by the number of passengers or the loading of luggages.

The electric actuator 7 includes a case 7a and a shaft 7b. The shaft 7b extends forward from the case 7a. The shaft 7b is capable of advancing and retreating in the longitudinal direction with respect to the case 7a. The case 7a accommodates a driving mechanism that displaces the shaft 7b in the longitudinal direction, and a control circuit that controls the operation of the driving mechanism. The control circuit is configured to receive a control signal from the outside via a connector (not illustrated) and adjust a displacement amount of the shaft 7b in response to the control signal.

When the light source unit 6 is mounted on the light source unit 5 as illustrated in FIG. 5, the left shaft portion 63 and the right shaft portion 64 of the optical unit 6 enter into the left engaging groove 53a and the right engaging groove 54a from the front side, respectively, and are engaged therewith. Thus, the left shaft portion 63 and the right shaft portion 64 are held by the left shaft holding portion 53 and the right shaft holding portion 54, respectively, so as to be pivotable around the axis A1. Further, the tip end of the shaft 7b of the electric actuator 7 enters into the engaging groove 65a of the optical unit 6 from the rear side, and is engaged therewith. Thus, the shaft 7b is connected to the joint 65.

Figure 7A:
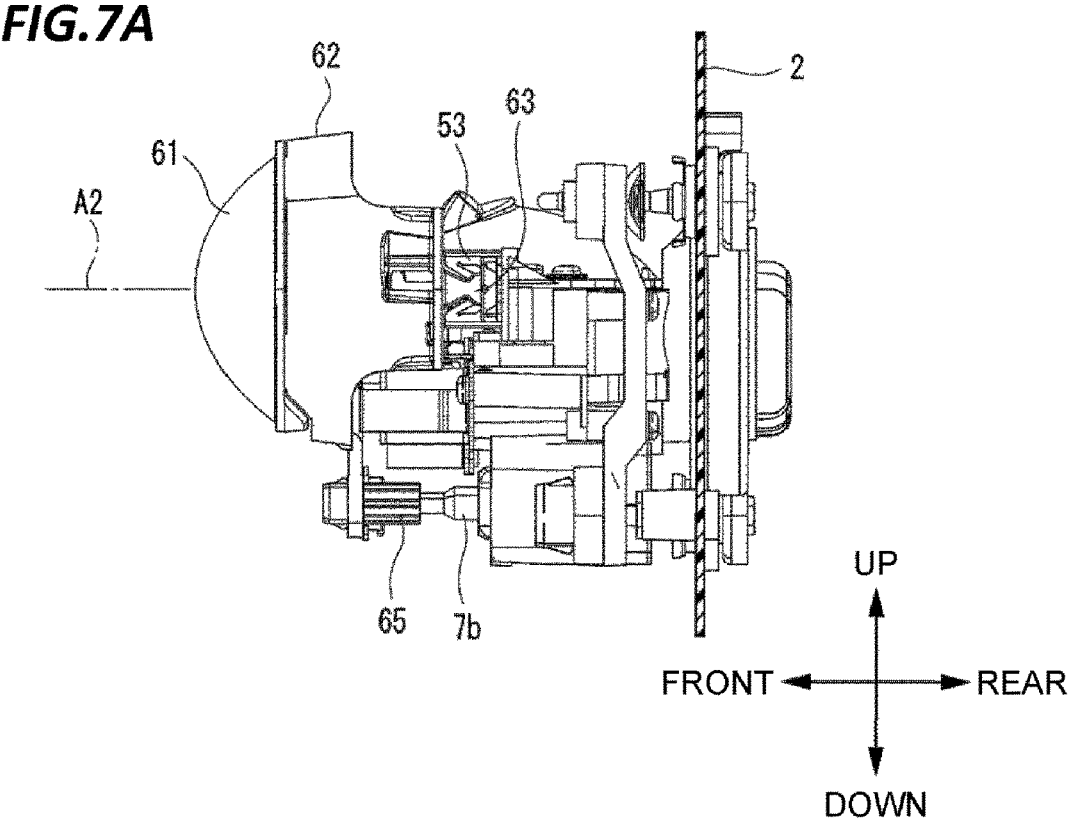
FIGS. 7A and 7B are views for explaining a leveling control by the head lamp device.
Figure 7B:
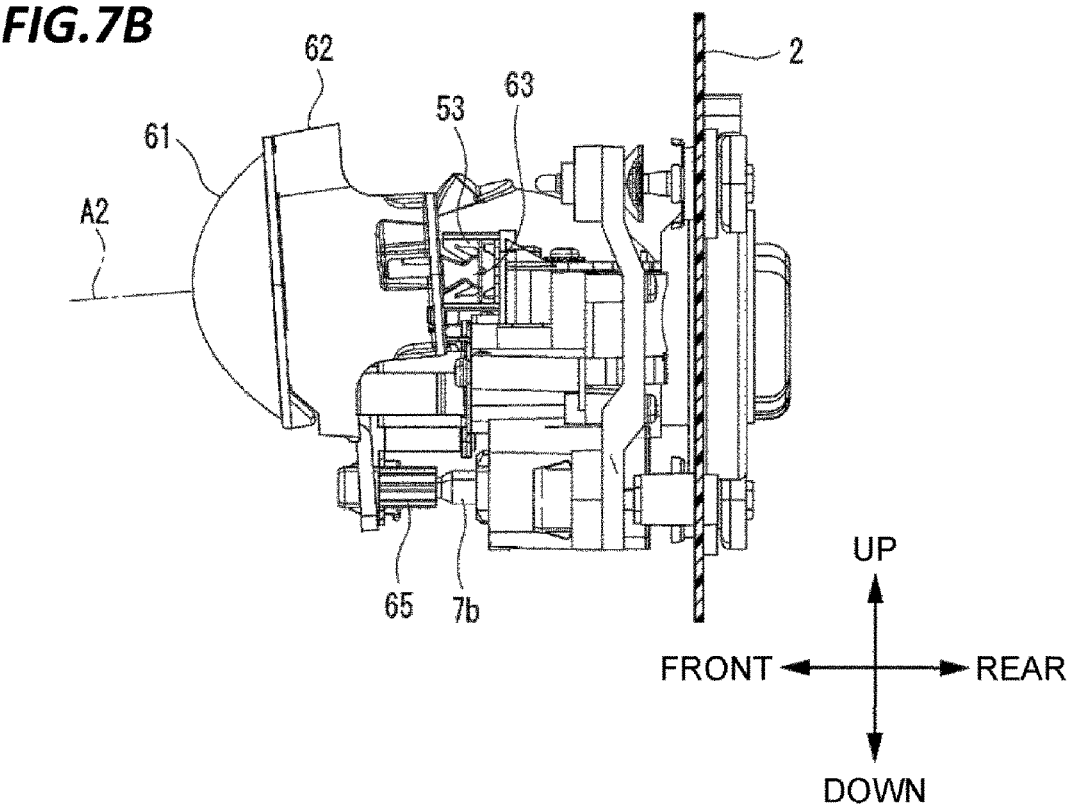

Descriptions will be made on operations of the electric actuator 7 and the optical unit 6 at the time of the leveling control, with reference to FIGS. 7A and 7B. FIG. 7A illustrates a state where the shaft 7b is disposed at the front end of the movable range. FIG. 7B illustrates a state where the shaft 7b is disposed at the rear end of the movable range.

When the shaft 7b of the electric actuator 7 is displaced rearward from the state illustrated in FIG. 7A by an input of an appropriate control signal, the lower portion of the lens holder 62 is pulled rearward via the joint 65. Thus, the left shaft portion 63 and the right shaft portion 64 are pivoted around the axis A1 counterclockwise when viewed from the left side in the left shaft holding portion 53 and the right shaft holding portion 54, respectively. Accordingly, as illustrated in FIG. 7B, the optical axis A2 of the projection lens 61 is inclined downward.

On the contrary, when the shaft 7b of the electric actuator 7 is displaced forward from the state illustrated in FIG. 7A by an input of an appropriate control signal, the lower portion of the lens holder 62 is pushed forward via the joint 65. Thus, the left shaft portion 63 and the right shaft portion 64 are pivoted around the axis A1 clockwise when viewed from the left side in the left shaft holding portion 53 and the right shaft holding portion 54, respectively. Accordingly, as illustrated in FIG. 7A, the optical axis A2 of the projection lens 61 is inclined upward.

As illustrated in FIG. 1, the head lamp device 1 includes an elastic member 8. As illustrated in FIGS. 2 and 3, the elastic member 8 includes a portion disposed between the second portion 52b of the heat sink 52 and the periphery of the opening 2b of the housing 2. Examples of the elastic member 8 include an O-ring, a gasket, a stretchable bellows member, and the like. Therefore, the elastic member 8 holds the second portion 52b of the heat sink displaceably with respect to the housing 2.

Figure 8:
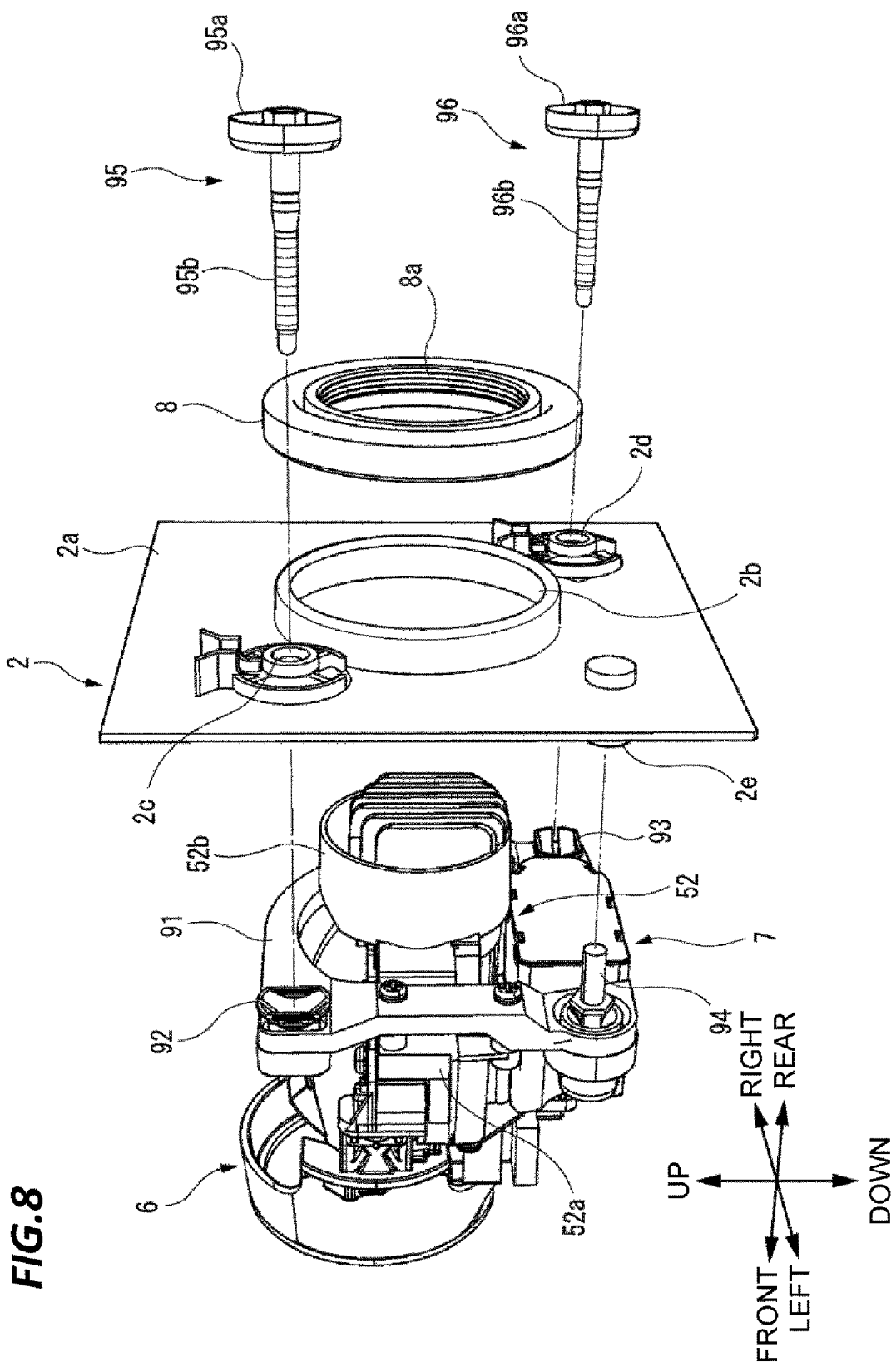
FIG. 8 is an exploded perspective view illustrating a configuration of the head lamp device.

As illustrated in FIG. 1, the head lamp device 1 includes an aiming unit 9. The aiming unit 9 is a mechanism that adjusts the initial position of the optical unit 6 (specifically, the initial position of the optical axis of the projection lens 61). As illustrated in FIG. 8, the aiming unit 9 includes a frame member 91, a first joint 92, a second joint 93, a fulcrum member 94, a first screw member 95, and a second screw member 96.

Meanwhile, in addition to the opening 2b, a first through-hole 2c, a second through-hole 2d, and a shaft support 2e are formed in the rear wall 2a of the housing 2. The first through-hole 2c is formed on the left side above the opening 2b. The second through-hole 2d is formed on the right side below the opening 2b. The shaft support 2e is provided on the left side below the opening on the front surface of the rear wall 2a.

The frame member 91 is fixed to a rear portion of the first portion 52a in the heat sink 52. Therefore, the frame member 91 is non-displaceable relative to the heat sink 52.

The first joint 92 is provided in a lower upper portion of the frame member 91. The first joint 92 includes a screw hole. The second joint 93 is provided in a right lower portion of the frame member 91. The second joint 93 includes a screw hole. The fulcrum member 94 is connected to a left lower portion of the frame member 91 via a ball joint. The fulcrum member 94 includes a shaft portion that extending rearward from the frame 91.

The first screw member 95 includes a head portion 95a and a shaft portion 95b. A threaded recess is formed on the outer peripheral surface of the shaft portion 95b. The second screw member 96 includes a head portion 96a and a shaft portion 96b. A threaded recess is formed on the outer peripheral surface of the shaft portion 96b.

Assembly of the heat sink 52, the aiming unit 9, and the elastic member 8 to the housing 2 is performed as follows. First, the second portion 52b of the heat sink 52 is inserted into the opening 2b from the front of the rear wall 2a of the housing 2. At this time, the shaft portion of the fulcrum member 94 of the aiming unit 9 is fixed to the shaft support 2e provided on the front surface of the rear wall 2a. The screw hole of the first joint 92 faces the first through-hole 2c of the housing 2. The screw hole of the second joint 93 faces the second through-hole 2d of the housing 2.

Subsequently, the elastic member 8 is mounted from the rear of the rear wall 2a. A part of the elastic member 8 is disposed between the second portion 52b of the heat sink 52 and the periphery of the opening 2b of the housing 2 to block the opening 2b. Thus, since a part of heat sink 52 is exposed to the outside of the housing 2, the heat dissipation is enhanced, while invasion of water or dust into the lamp chamber 4 is suppressed. Further, the relative displacement of the second portion 52b with respect to the housing 2 is allowed while the sealing state of the opening 2b is maintained.

Further, the shaft portion 95b of the first screw member 95 and the shaft portion 96b of the second screw member 96 are inserted into the first through-hole 2c and the second through-hole 2d of the housing 2, respectively. As illustrated in FIGS. 5 and 7, the shaft portion 95b of the first screw member 95 is screwed into the screw hole formed in the first joint 92 in the lamp chamber 4. The shaft portion 96b of the second screw member 96 is screwed into the screw hole formed in the second joint 93 in the lamp chamber 4.

In this state, as illustrated in FIG. 3, the head portion 95a of the first screw member 95 and the head portion 96a of the second screw member 96 are disposed outside the rear wall 2a of the housing 2.

Figure 9A:
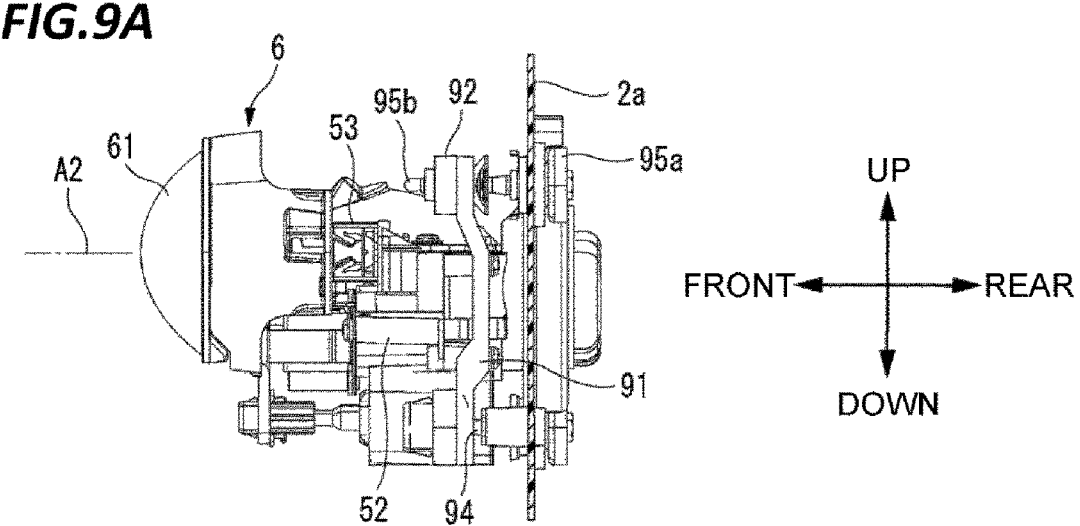
FIGS. 9A to 9C are views for explaining an operation of the head lamp device by a first screw member.
Figure 9B:
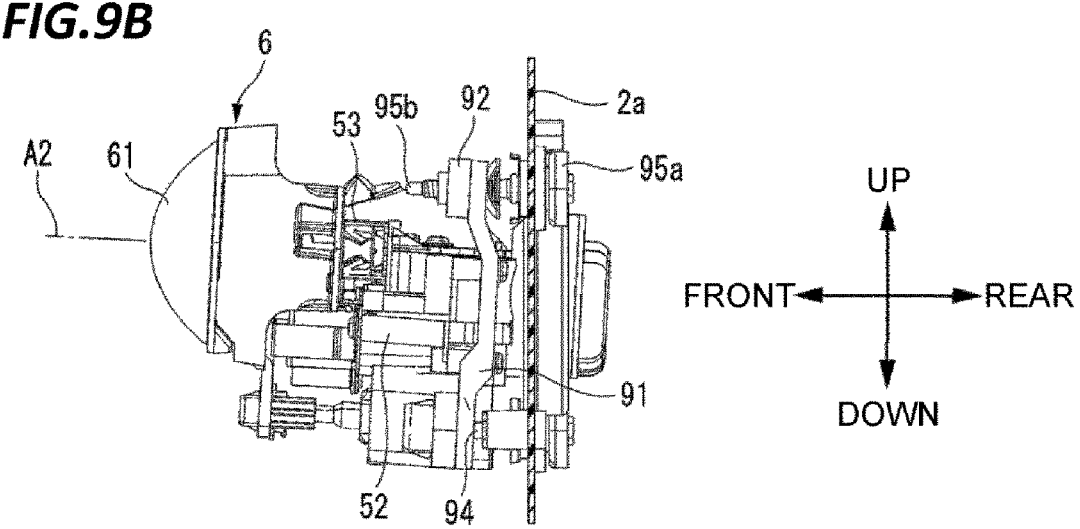
Figure 9C:
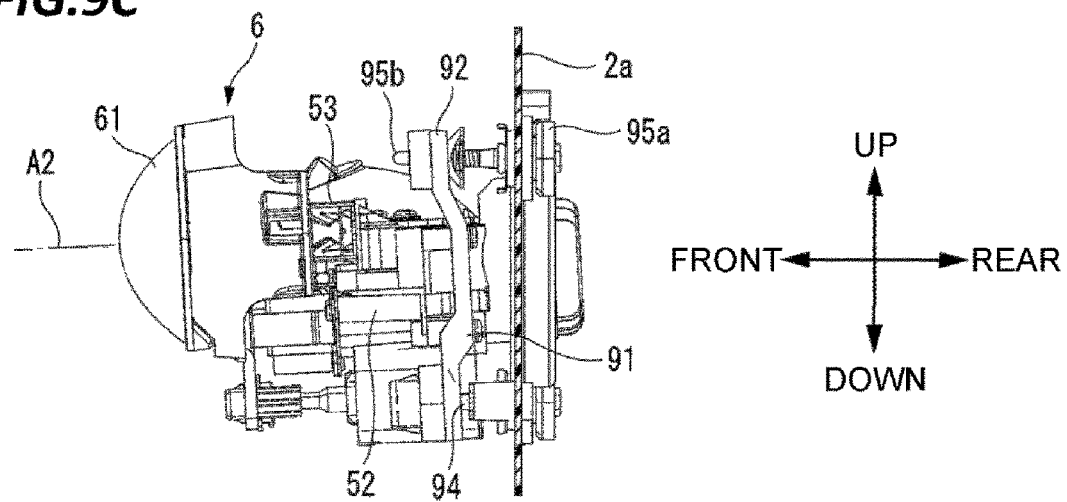

FIGS. 9A to 9C are views for explaining the movements of respective parts of the head lamp device 1 in accordance with the rotation of the first screw member 95. FIG. 9A illustrates the initial state.

From this state, when the head portion 95a is manually rotated clockwise by a jig (not illustrated), the screwing position of the shaft portion 95b and the first joint 92 is changed, so that the first joint 92 is displaced rearward. Thus, the frame member 91 is inclined upward around the fulcrum member 94. Since the frame member 91 is fixed such that the relative position with respect to the heat sink 52 is unchanged, and the optical unit 6 is supported by the left shaft holding portion 53 and the right shaft holding portion 54 of which the relative positions with respect to the heat sink 52 are unchanged, the heat sink 52 and the optical unit 6 are inclined upward with respect to the housing 2. As a result, as illustrated in FIG. 9B, the optical axis A2 of the projection lens 61 is inclined upward.

On the contrary, when the head portion 95a is manually rotated counterclockwise from the state illustrated in FIG. 9A, the first joint 92 is displaced forward. Thus, the frame member 91 is inclined downward around the fulcrum member 94, and the heat sink 52 and the optical unit 6 are displaced downward with respect to the housing 2. As a result, as illustrated in FIG. 9C, the optical axis A2 of the projection lens 61 is inclined downward.

That is, the first screw member 95 that extends through the rear wall 2a of the housing 2 is manually rotated, so that the heat sink 52 and the optical unit 6 are displaced in the vertical direction with respect to the housing 2.

Figure 10A:
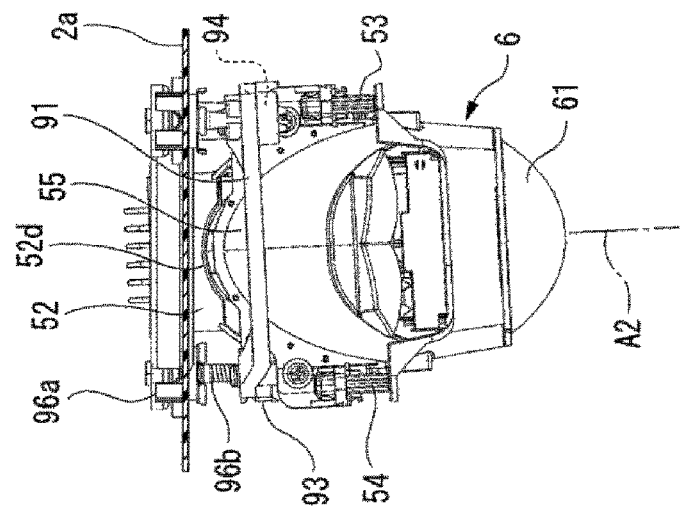
FIGS. 10A to 10C are views for explaining an operation of the head lamp device by a second screw member.
Figure 10B:
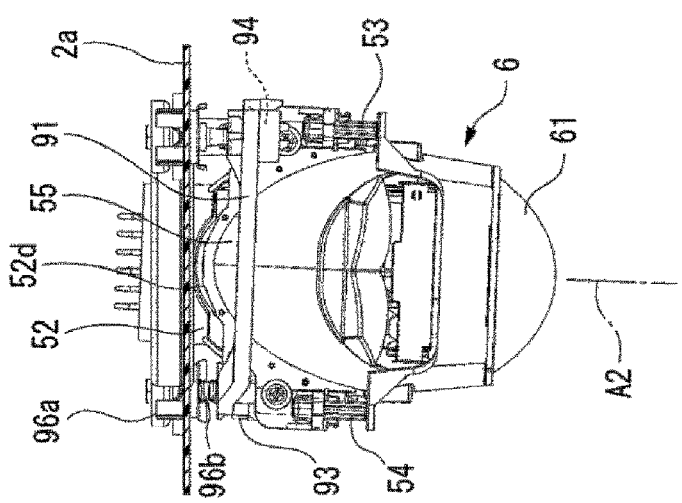
Figure 10C:
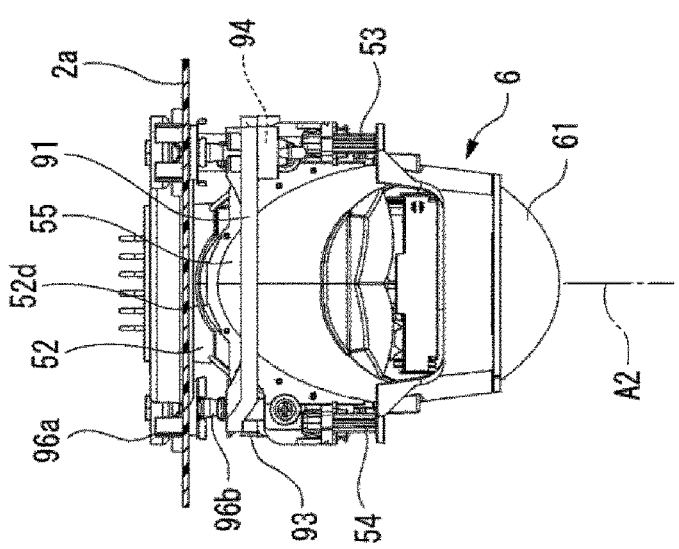

FIGS. 10A to 10C are views for explaining movement of respective parts of the head lamp device 1 in accordance with the rotation of the second screw member 96. FIG. 10A illustrates the initial state.

From this state, when the head portion 96a is manually rotated clockwise by a jig (not illustrated), the screwing position of the shaft portion 96b and the second joint 93 is changed, so that the second joint 93 is displaced rearward. Thus, the frame member 91 is inclined rightward around the fulcrum member 94. Since the frame member 91 is fixed such that the relative position with respect to the heat sink 52 is unchanged, and the optical unit 6 is supported by the left shaft holding portion 53 and the right shaft holding portion 54 of which the relative positions with respect to the heat sink 52 are unchanged, the heat sink 52 and the optical unit 6 are inclined rightward with respect to the housing 2. As a result, as illustrated in FIG. 10B, the optical axis A2 of the projection lens 61 is inclined rightward.

On the contrary, when the head portion 96a is manually rotated counterclockwise from the state illustrated in FIG. 10A, the second joint 93 is displaced forward. Thus, the frame member 91 is inclined leftward around the fulcrum member 94, and the heat sink 52 and the optical unit 6 are displaced leftward with respect to the housing 2. As a result, as illustrated in FIG. 10C, the optical axis A2 of the projection lens 61 is inclined leftward.

That is, the second screw member 96 that extends through the rear wall 2a of the housing 2 is manually rotated, so that the heat sink 52 and the optical unit 6 are displaced in the horizontal direction with respect to the housing 2.

According to the configuration of the head lamp device 1 of the present exemplary embodiment, the adjustment of the initial position of the optical unit 6 (the reference position of the optical axis A2 of the projection lens 61) is performed by manually rotating the first screw member 95 and the second screw member 96. At this time, both the optical unit 6 and the heat sink 52 are displaced with respect to the housing 2, while the relative positions thereof are unchanged. The displacement of the heat sink 52 with respect to the housing is allowed by the elastic member 8.

Meanwhile, the leveling control by the electric actuator 7 is performed such that the optical unit 6 is relatively displaced with respect to the heat sink 52. Therefore, even though the elastic member 8 is hardened under a low-temperature environment so that the elasticity or the flexibility, which allows the displacement of the heat sink 52 with respect to the housing 2, is lost, the leveling control is not disrupted at all. In other words, since the vehicle is placed under such a low-temperature environment after the manual adjustment of the initial position of the optical unit 6 is performed, it is not necessary to consider the hardening of the elastic member 8 in performing the leveling control. Therefore, it is possible to performing the leveling control even under a low-temperature environment while providing a mechanism for manually adjusting the initial position of the optical unit 6.

As illustrated in FIG. 2, the first portion 52a of the heat sink 52 includes a plurality of heat radiation fins 52c. The plurality of heat radiation fins 52c are arranged in the horizontal direction below the light source 51. Each heat radiation fin 52c extends in the longitudinal direction. The front end portion of each heat radiation fin 52c (i.e., the portion closest to the optical unit 6) is positioned between the light source 51 and the optical unit 6.

Since the second portion 52b of the heat sink 52 is exposed to the outside of the housing 2, and the heat radiation fins 52c are also provided in the first portion 52a of the heat sink 52 that is disposed in the lamp chamber 4, the heat dissipation of the heat sink 52 may be enhanced. Since the heat dissipation is enhanced, the enlargement of the heat sink 52 may be suppressed. Since the enlargement of the relatively heavy heat sink 52 is suppressed, the initial position adjustment of the optical unit 6 may be easily performed manually by the first screw member 95 and the second screw member 96.

As illustrated in FIG. 6, the light source unit 5 includes a reflector 55. The reflector 55 is supported by the first portion 52a of the heat sink 52. The reflector 55 is configured to reflect at least a part of the light emitted from the light source 51 toward the optical unit 6.

As illustrated in FIG. 2, the first portion 52a of the heat sink 52 includes a recess that is recessed toward the second portion 52b exposed to the outside of the housing 2. As illustrated in FIGS. 10A to 10C, a part of the reflector 55 is disposed in the recess 52d.

Since the second portion 52b is exposed to the outside of the housing 2, the heat dissipation of the heat sink 52 is enhanced. Thus, a part of the volume of the heat sink 52 may be used as a space for accommodating the reflector 55. Accordingly, the utilization efficiency of the space in the lamp chamber 4 may be enhanced, and the enlargement of the illumination device 1 may be suppressed. Further, since the enlargement of the relatively heavy heat sink 52 is suppressed, the initial position adjustment of the optical unit 6 may be easily performed manually by the first screw member 95 and the second screw member 96.

As illustrated in FIG. 8, the elastic member 8 includes an inner peripheral portion 8a that is in contact with the second portion 52b of the heat sink 52. The inner peripheral portion 8a has a circular shape. That is, the second portion 52b of the heat sink 52 has a circular shape when viewed from the outside of the opening 2b. Further, as illustrated in FIG. 2, the elastic member 8 includes an outer peripheral portion 8b that is in contact with the opening 2b of the housing 2. As described above, since the opening 2b has a circular shape, the outer peripheral portion 8b also has a circular shape.

In the initial position adjustment of the optical unit 6 by the first screw member 95 and the second screw member 96, the elastic member 8 is deformed by the displacement of the second portion 52b of the heat sink 52 with respect to the housing 2. According to the above configuration, stresses generated due to the deformation are hard to concentrate on a specific point. Therefore, deterioration of the sealability of the elastic member 8 may be suppressed. Further, since the stress generated due to the deformation of the elastic member 8 is hard to concentrate on a specific point, the initial position adjustment of the optical unit 6 may be easily performed manually by the first screw member 95 and the second screw member 96.

For obtaining such an effect, it is sufficient that at least one of the inner peripheral portion 8a and the outer peripheral portion 8b of the elastic member 8 has a circular shape. That is, when the opening 2b of the housing 2 and the outer peripheral portion 8b of the elastic member 8 have a circular shape, the shape of the inner peripheral portion 8a of the elastic member 8 and the cross-sectional shape of the second portion 52b of the heat sink 52 may be appropriately determined. Further, when the shape of the inner peripheral portion 8a of the elastic member 8 and the cross-sectional shape of the second portion 52b of the heat sink 52, the shapes of the opening 2b of the housing 2 and the outer peripheral portion 8b of the elastic member 8 may be appropriately determined.

The above-described exemplary embodiment is merely illustrative for facilitating the understanding of the present disclosure. The configuration according to the above-described exemplary embodiment may be appropriately changed or modified without departing from the spirit of the present disclosure. Further, it is obvious that equivalents are included in the scope of the present disclosure.

In the above-described exemplary embodiment, the light source 51 and the reflector 55 are supported singly in the upper portion of the first portion 52a of the heat sink 52. However, as illustrated in FIG. 11, a configuration may be adopted, in which a first light source 151 and a first reflector 155 are supported in the upper portion of the first portion 52a of the heat sink 52, and a second light source 251 and a second reflector 255 are supported in the lower part of the first portion 52a. The first reflector 155 is configured to reflect at least a part of the light emitted from the first light source 151 toward the optical unit 6. The second reflector 255 is configured to reflect at least a part of the light emitted from the second light source 251 toward the optical unit 6.

Figure 12:
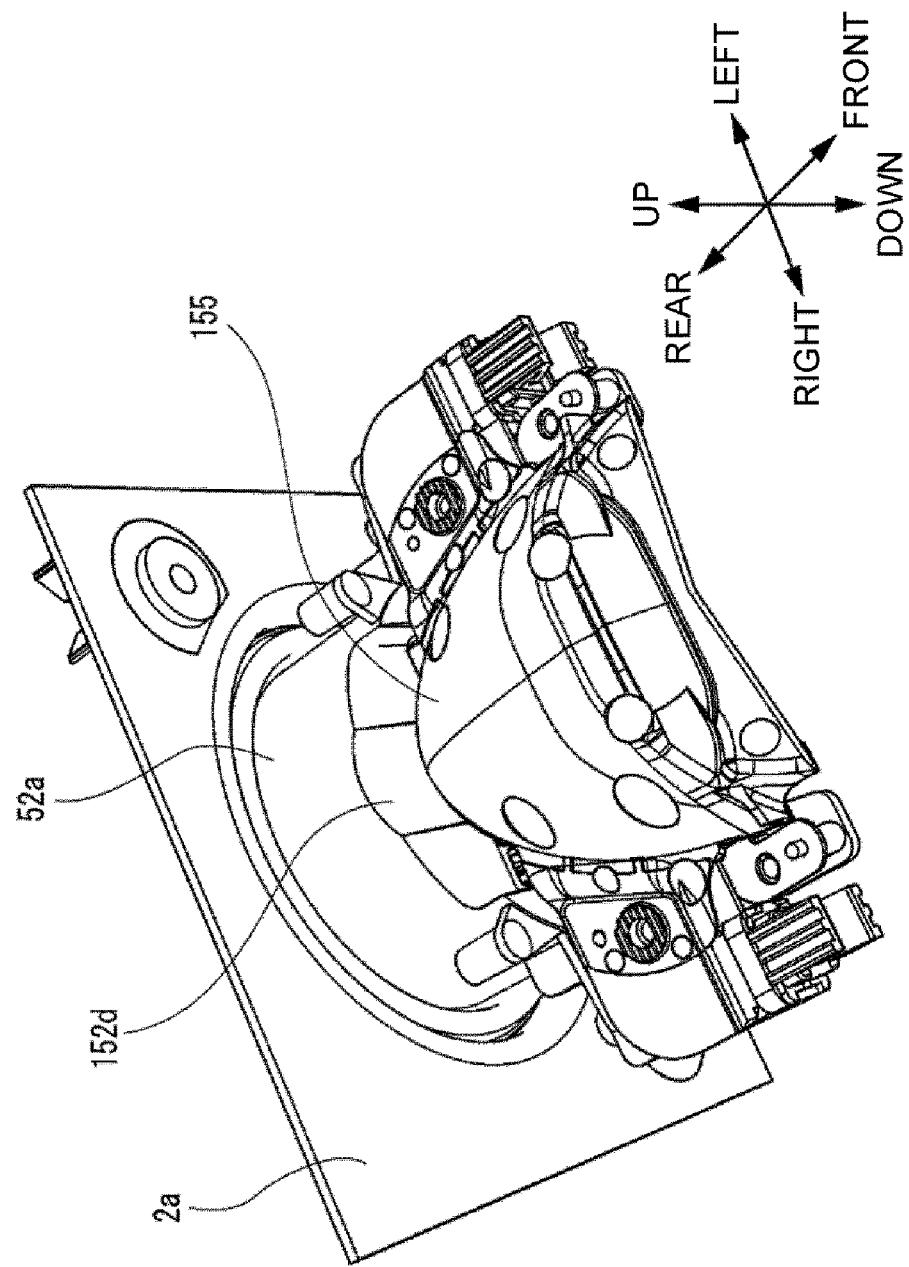
FIG. 12 is a perspective view illustrating a part of the head lamp device according to another modification (the inside of the lamp chamber).
Figure 13:
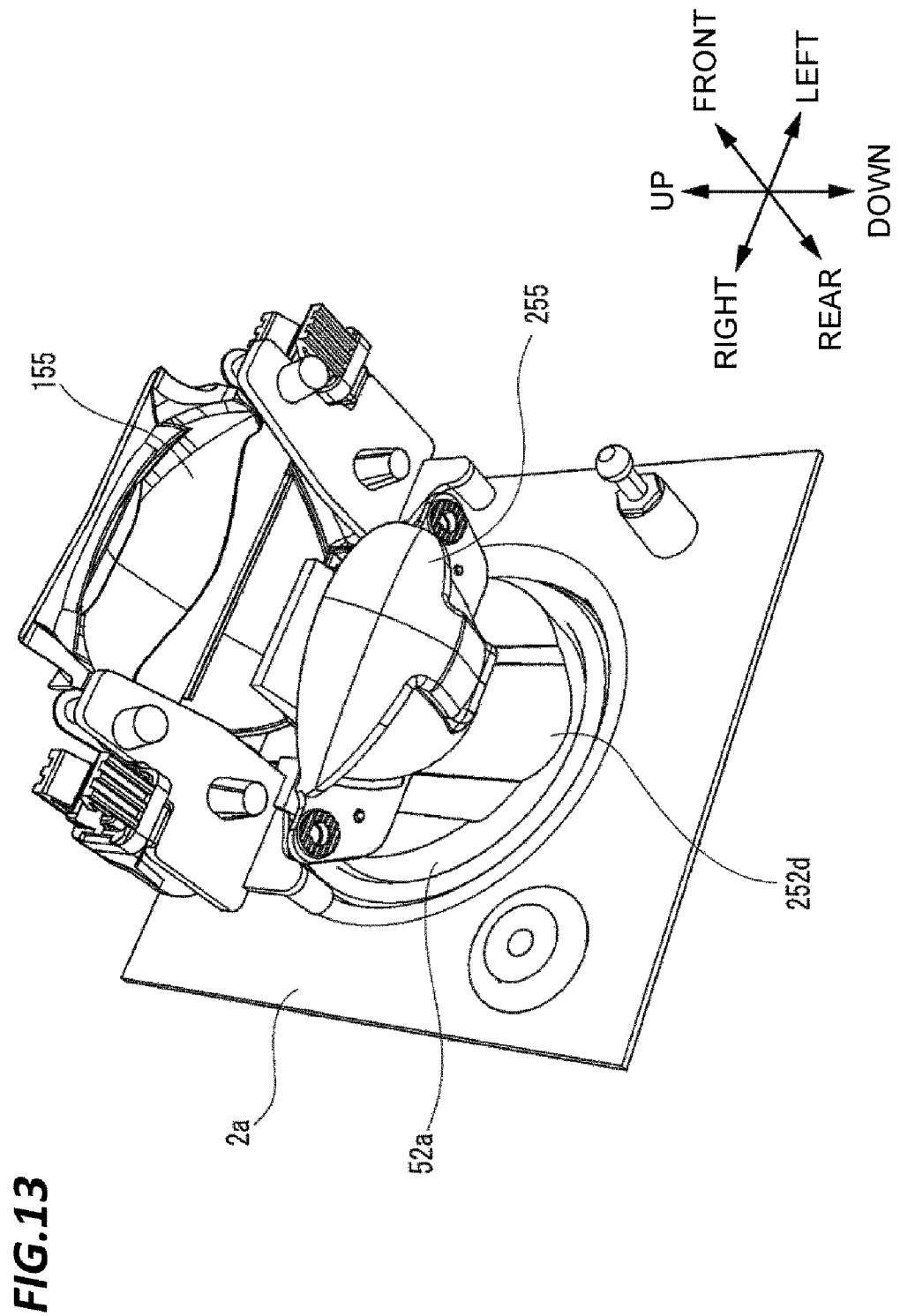
FIG. 13 is a perspective view illustrating a part of the head lamp device according to still another modification (the inside of the lamp chamber).

FIG. 12 is a perspective view of a configuration in which the electric actuator 7 and the aiming unit 9 are separated from the state illustrated in FIG. 11, when viewed from the right upper front side. FIG. 13 is a perspective view of the configuration when viewed from the right lower front side.

As illustrated in FIG. 12, the upper portion of the first portion 52a of the heat sink 52 includes a first recess 152d that is recessed toward the second portion 52b exposed to the outside of the housing 2. A part of the first reflector 155 is disposed in the first recess 152d.

As illustrated in FIG. 13, the lower portion of the first portion 52a of the heat sink 52 includes a second recess 252d that is recessed toward the second portion 52b exposed to the outside of the housing 2. A part of the second reflector 255 is disposed in the second recess 252d.

Since the second portion 52b is exposed to the outside of the housing 2, the heat dissipation of the heat sink 52 is enhanced. Thus, a part of the volume of the heat sink 52 may be used as a space for accommodating the first reflector 155 and the second reflector 255. Accordingly, the utilization efficiency of the space in the lamp chamber 4 may be enhanced, and the enlargement of the illumination device 1 may be suppressed. Further, since the enlargement of the relatively heavy heat sink 52 is suppressed, the initial position adjustment of the optical unit 6 may be easily performed manually by the first screw member 95 and the second screw member 96.

In the above-described exemplary embodiment, the optical unit 6 includes the left shaft portion 63 and the right shaft portion 64, and the light source unit 5 includes the left shaft holding portion 53 and the right shaft holding portion 54. However, in order to make the optical unit 6 relatively displaceable with respect to the heat sink 52, the light source unit 5 may include a left shaft portion and a right shaft portion, and the optical unit 6 may include a left shaft holding portion and a right shaft holding portion, which hold the left shaft portion and the right shaft portion, respectively.

In the above-described exemplary embodiment, the electric actuator 7 is used in the leveling control to displace the optical axis A2 of the projection lens 61 in the vertical direction. Additionally or alternatively, an electric actuator may be used in a swivel control to displace the optical axis A2 of the projection lens 61 in the horizontal direction.

In the above-described exemplary embodiment, the head lamp device 1 has been described as an example of the illumination device. However, the present disclosure may be applied to various illumination devices in which an optical unit is provided in a lamp chamber defined by a housing and a light transmitting cover, and an initial position adjustment of the optical unit, and a position adjustment of the optical unit, which is independent from the position adjustment, are required.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An illumination device mounted on a vehicle, the illumination device comprising:
a housing configured to define at least a part of a lamp chamber therein, and including an opening;
a light source disposed in the lamp chamber;
an optical unit disposed in the lamp chamber, and configured to irradiate light emitted from the lamp source in a predetermined direction;
a heat sink including a first portion configured to support the light source in the lamp chamber, and a second portion exposed to an outside of the housing through the opening;
an elastic member disposed between the second portion of the heat sink and a periphery of the opening;
a first screw member extending through a first through-hole formed through the housing and screwed into a first screw hole formed through a frame member that is fixed to a rear portion of the first portion of the heat sink, and configured to incline both the heat sink and the optical unit with respect to the housing in a vertical direction while being manually rotated clockwise and counterclockwise, such that an initial position of an optical axis of the optical unit is adjusted in the vertical direction;
a second screw member extending through a second through-hole formed at a diagonal position of the first through-hole through the housing, and configured to incline both the heat sink and the optical unit with respect to the housing in a horizontal direction while being manually rotated clockwise and counterclockwise, such that an initial position of the optical axis of the optical unit is adjusted in the horizontal direction; and
an electric actuator disposed in the lamp chamber, and configured to incline the optical unit with respect to the heat sink in a vertical direction, such that the optical axis of the optical unit is inclined in the vertical direction, thereby adjusting an inclination of the optical axis of the optical unit with reference to the initial position of the optical axis of the optical unit in the vertical direction.

2. The illumination device of claim 1, wherein the first portion includes a heat radiation fin, and
a portion of the heat radiation fin closest to the optical unit is positioned between the light source and the optical unit.

3. The illumination device of claim 2, further comprising:
a reflector supported by the first portion of the heat sink, and configured to reflect at least a part of the lights emitted from the light source toward the optical unit,
wherein the first portion of the heat sink includes a recess that is recessed toward the second portion, and
a part of the reflector is disposed in the recess.

4. The illumination device of claim 3, wherein the elastic member includes:
an inner peripheral portion that is in contact with the second portion of the heat sink; and
an outer peripheral portion that is in contact with the periphery of the opening of the housing, and
at least one of the inner peripheral portion and the outer peripheral portion has a circular shape.

5. The illumination device of claim 3, wherein the light source and the reflector are supported by the first portion of the heat sink at an upper portion of the first portion of the heat sink.

6. The illumination device of claim 5, wherein an additional light source and an additional reflector are supported by the first portion of the heat sink at a lower portion of the first portion of the heat sink.

7. The illumination device of claim 2, wherein the elastic member includes:
an inner peripheral portion that is in contact with the second portion of the heat sink; and
an outer peripheral portion that is in contact with the periphery of the opening of the housing, and
at least one of the inner peripheral portion and the outer peripheral portion has a circular shape.

8. The illumination device of claim 1, further comprising:
a reflector supported by the first portion of the heat sink, and configured to reflect at least a part of the light emitted from the light source toward the optical unit,
wherein the first portion of the heat sink includes a recess that is recessed toward the second portion, and
a part of the reflector is disposed in the recess.

9. The illumination device of claim 8, wherein the elastic member includes:
an inner peripheral portion that is in contact with the second portion of the heat sink; and
an outer peripheral portion that is in contact with the periphery of the opening of the housing, and
at least one of the inner peripheral portion and the outer peripheral portion has a circular shape.

10. The illumination device of claim 8, wherein the light source and the reflector are supported by the first portion of the heat sink at an upper portion of the first portion of the heat sink.

11. The illumination device of claim 10, wherein an additional light source and an additional reflector are supported by the first portion of the heat sink at a lower portion of the first portion of the heat sink.

12. The illumination device of claim 1, wherein the elastic member includes:
an inner peripheral portion that is in contact with the second portion of the heat sink; and
an outer peripheral portion that is in contact with the periphery of the opening of the housing, and
at least one of the inner peripheral portion and the outer peripheral portion has a circular shape.

* * * * *